United States Patent [19]

Bronstert et al.

[11] Patent Number: 5,055,527
[45] Date of Patent: Oct. 8, 1991

[54] THERMOPLASTICS IMPACT MODIFIED WITH FUNCTIONALIZED POLYMERS AND USE THEREOF FOR PRODUCING MOLDINGS

[75] Inventors: Klaus Bronstert, Carlsberg; Hans-Dieter Schwaben, Freisbach; Adolf Echte, Ludwigshafen, all of Fed. Rep. of Germany

[73] Assignee: BASF Aktiengesellschaft, Ludwigshafen, Fed. Rep. of Germany

[21] Appl. No.: 541,078

[22] Filed: Jun. 20, 1990

Related U.S. Application Data

[63] Continuation of Ser. No. 414,575, Sep. 29, 1989, abandoned, which is a continuation of Ser. No. 152,874, Feb. 5, 1988, abandoned.

[30] Foreign Application Priority Data

Feb. 25, 1987 [DE] Fed. Rep. of Germany ....... 3706016

[51] Int. Cl.$^5$ ................ C08L 35/00; C08L 9/00; C08L 25/02
[52] U.S. Cl. .................................. 525/207; 525/232; 525/291
[58] Field of Search .............. 525/207, 232, 241

[56] References Cited

U.S. PATENT DOCUMENTS

| | | | |
|---|---|---|---|
| 4,393,164 | 7/1983 | McKee et al. | 525/83 |
| 4,460,741 | 7/1984 | Dufour et al. | 525/207 |
| 4,551,510 | 11/1985 | Morris et al. | 56/295 |
| 4,721,752 | 1/1988 | Schepers et al. | 525/207 |
| 4,753,991 | 6/1988 | Bronstert | 525/207 |

FOREIGN PATENT DOCUMENTS 3140565 4/1983 Fed. Rep. of Germany .

OTHER PUBLICATIONS

Ser. No. 889,372.

*Primary Examiner*—Marion E. McCamish
*Assistant Examiner*—Susan Berman
*Attorney, Agent, or Firm*—Keil & Weinkauf

[57] ABSTRACT

Impact modified thermoplastic blends of components A, B and optionally C, consisting of:

A) from 99 to 60 percent by weight of a polymeric rigid matrix consisting of
 a1) 60–99.5 percent by weight of an aromatic vinyl compound present as copolymerized units,
 a2) 0.5–20 percent by weight of an unsaturated carboxylic anhydride present as copolymerized units and
 a3) 014 35 percent by weight of an alkenylnitrile present as copolymerized units,
B) from 1 to 40 percent by weight of a polymeric flexibilizing component consisting of
 b1) 100–60 percent by weight of a monomer from the group of the 1,4-dienes which is present as copolymerized units and
 b2) 0–40 percent by weight of an aromatic vinyl compound present as copolymerized units. and optionally
C) customary additives in customary amounts, the polymers of flexibilizing component B having amino end groups, are used for producing moldings.

1 Claim, No Drawings

THERMOPLASTICS IMPACT MODIFIED WITH FUNCTIONALIZED POLYMERS AND USE THEREOF FOR PRODUCING MOLDINGS

This application is a continuation of application Ser. No. 414,575, filed on Sept. 29, 1989, now abandoned which is a continuation of application Ser. No. 152,874, filed on Feb. 5, 1988, now abandoned.

The present invention relates to impact modified thermoplastic blends. Blends of this type are used for producing moldings.

Styrene-acrylonitrile copolymers are impact modified by admixing a flexibilizing phase which is customarily prepared in a multistage emulsion polymerization. This is known and described for example in the publication by C.B. Bucknall, "Toughened Plastics", Applied Science Publishers Ltd., London, 1977, in particular pages 90 ff.

The emulsion polymers required for this purpose are technically complicated, costly and difficult to prepare reproducibly; in particular the lack of uniformity in the graft envelope between different batches can lead to variations in product quality.

It is an object of the present invention to find a flexibilizing component which is simple, inexpensive and readily reproducible to prepare and with which the thermoplastic component can be impact modified.

We have found that this object is achieved by providing a thermoplastic blend as claimed in claim 1.

In what follows, the buildup of the thermoplastic blend according to the invention is described together with the process used for its preparation and the starting and auxiliary materials required.

The thermoplastic blend contains components A, B and optionally C. Preferably, the thermoplastic blend consists of components A and B. The blend may also contain customary additives in customary amounts as component C.

The polymeric molding composition comprises, in each case based on the sum of the weights of A and B:

A) 99-60, preferably 95-65, % by weight of a polymeric rigid matrix

The polymeric rigid matrix can contain as copolymerized units, based on A, the following types and amounts of monomers a1) 60-99.5, preferably 65-99, % by weight, a2) 0.5-20, preferably 0.5-10, % by weight and the rigid matrix can also contain the monomers a3) 0-35, preferably 0-30% by weight.

B) 1-40, preferably 5-35, % by weight of a polymeric flexibilizing component

The polymeric flexibilizing component can contain as copolymerized units the monomers, based on B, b1) 100-60, preferably 100-70, % by weight, b2) 0-40, preferably 0-30, % by weight.

Based on 100 parts by weight of the sum of components A and B, the polymeric molding composition can contain from 0 to 30, preferably 0-25, parts by weight of component C, i.e. customary additives.

In detail the molding composition consists of component consists of:

Component A

It contains a1) one or more aromatic vinyl monomers of 8 to 10 carbon atoms. Preferably, only styrene is used. It also contains a2) an unsaturated carboxylic anhydride copolymerizable with a1). Preferably, maleic anhydride is used. Possible further comonomers a3) present can comprise one or more alkenylnitriles. Preference is given to using acrylonitrile.

The molecular weight of component A is within the range 50,000 to 400,000 g/mol, preferably from 100,000 to 300,000 g/mol, determined from measurements of the intrinsic viscosity and calculated from the Mark-Houwink equation.

The polymeric material is prepared by a conventional free-radical polymerization in the mass, in solution or in suspension. These processes are known to those skilled in the art (cf. for example U.S. Pat. No. 4,551,510 and B.C. Trivedi and B.M. Culbertson in the publication "Maleinic Anhydride" Chapters 9, 10 and 11, Plenum Press, New York [1982]), so that no further explanations are required. In the preparation, it is possible to use the customary free radical starters, for example organic peroxides or azo compounds, and also the customary molecular weight regulants, such as mercaptans, and also stabilizers and the like.

Component B

It contains b1) as starting monomer one or more 1,3-dienes. Preference is given to the exclusive use of butadiene. Further possible starting comonomers present as b2) can be aromatic monovinyl compounds, preferably styrene.

The thermoplastic component B shall be terminated with amino groups.

The polymeric component B is prepared for example by anionic polymerization of butadiene and termination with 1,5-diazabicyclo[3.1.0]hexane. The process is described in detail in Ser. No. 06/889,372, now U.S. Pat. No. 4,753,991 issued June 28, 1988 so that no description is necessary here.

The molecular weight of component B is within the range from 30,000 to 400,000 g/mol (weight average), preferably from 50,000 to 300,000 g/mol, in particular from 60,000 to 250,000 g/mol, determined by gel permeation chromatography.

The preferred polymeric starting material for component B is homopolybutadiene or a block copolymer of butadiene containing up to 40% by weight of styrene. The transition between the blocks can be sharp or smudged.

Component C

Additives used in the preparation of the molding composition according to the invention can comprise, as is known to those skilled in the art, mineral oils, antistats, flameproofing agents, pigments, stabilizers and other customary additives which improve the performance characteristics, in amounts from 0 to 30, preferably from 0 to 25, % by weight, based on 100 parts by weight of the sum of components A and B.

The blends can be prepared using any desired means which permit homogeneous mixing of components A and B in the melt, for example rolls, kneaders or extruders. In the preparation of the blends, the two components, including if present component C, can be premixed or metered in separately. The preparation temperature is within the range from 150° to 350° C., preferably from 200° to 300° C.

It is also possible, but less preferable, to mix components A and B in the form of solutions and then to remove the solvent.

The Examples and Comparative Tests which follow serve to illustrate the invention in more detail without, however, restricting its scope. In each case, 10% by weight of component B and 90% by weight of component A were used.

In Examples 1 to 3, a two-block copolymer of 9% by weight of styrene and 91% by weight of butadiene having a sharp block transition and a molecular weight (GPC average) of 75,000 g/mol where the polybutadiene end had been modified with a 1,3-propylenediamine end group as described in German Patent Application P 35 27 909 [EP Application No. 86110539.3] Example 3 was used.

In the corresponding Comparative Tests (CT) component B comprised a nonfunctionalized homopolybutadiene having a solution viscosity of 130 ml/g (5% strength by weight in toluene at 25° C).

The polymers of component A are specified in more detail in the Examples.

The molding compositions were prepared on a ZSK 30 twin-screw extruder from Werner und Pfleiderer at from 250° to 300° C. The molding compositions emerging as polymer extrudates were cooled in a waterbath, then granulated, dried and subsequently tested against the following standards:
1. hole impact strength aKL in kJ/m$^2$ as per German Standard Specification DIN 53,753
2. impact strength aN in kJ/m$^2$ as per German Standard Specification DIN 53,453
3. breaking strength RF in N/mm$^2$ as per German Standard Specification DIN 53,455.

EXAMPLE 1 AND COMPARATIVE TEST 1

Component A here comprised a terpolymer of 75 parts by weight of styrene, 24 parts by weight of acrylonitrile and one part by weight of maleic anhydride, having a viscosity number VN of 76 (0.5% strength by weight in dimethylformamide, DMF, at 25° C.).

EXAMPLE 2 AND COMPARATIVE TEST 2

Component A here comprised a copolymer of 94.5 parts by weight of styrene and 5.5 parts by weight of maleic anhydride, having a VN of 79 (0.5% strength by weight in DMF at 25° C.).

EXAMPLE 3 AND COMPARATIVE TEST 3

Component A here comprised a copolymer of 99 parts by weight of styrene and one part by weight of maleic anhydride, having a VN of 70 (0.5% strength by weight in DMF at 25° C.).

TABLE

|       | aKL (kJ/m$^2$) | aN (kJ/m$^2$) | RF (N/mm$^2$) | aKL (kJ/m$^2$) of unmodified thermoplastic |
|-------|----------------|---------------|---------------|--------------------------------------------|
| Ex. 1 | 10.5           | 18.4          | 49.0          | 3.1                                        |
| CT. 1 | 4.3            | 6.2           | 37.4          | 3.1                                        |
| Ex. 2 | 5.3            | 11.3          | 40.4          | 2.7                                        |
| CT. 2 | 4.7            | 7.9           | 26.3          | 2.7                                        |
| Ex. 3 | 6.3            | 14.6          | 35.5          | 2.8                                        |
| CT. 3 | 5.7            | 9.3           | 29.7          | 2.8                                        |

We claim:

1. An impact modified thermoplastic blend of components A, B and optionally C, consisting of:
   A) from 99 to 60 percent by weight, based on the sum of A and B, of a polymeric rigid matrix consisting of
      a1) 60–99.5 percent by weight of an aromatic vinyl compound present as copolymerized units,
      a2) 0.5–20 percent by weight of an unsaturated carboxylic anhydride present as copolymerized units and
      a3) 0–35 percent by weight of an alkenylnitrile present as copolymerized units, the weight percentages in each case being based on the sum of a1, a2 and a3,
   B) from 1 to 40 percent by weight, based on the sum of A and B, of a polymeric flexibilizing component consisting of a modified block copolymer of
      b1) 91–60 percent by weight of the monomer 1,4-butadiene which is present as copolymerized units and
      b2) 9–40 percent by weight of styrene present as copolymerized units, the weight percentages in each case being based on the sum of b1 and b2 and also
   C) from 0 to 30 percent by weight, based on 100 parts by weight of the sum of components A and B, of customary additives,
wherein the polymers of flexibilizing component B have been modified by substitution with amino groups only at the chain ends and have only one amino end group per chain end at the chain end.

* * * * *

UNITED STATES PATENT AND TRADEMARK OFFICE
CERTIFICATE OF CORRECTION

PATENT NO. : 5,055,527

DATED : October 8, 1991

INVENTOR(S) : Klaus BRONSTERT et al.

It is certified that error appears in the above-identified patent and that said Letters Patent is hereby corrected as shown below:

On the Cover Page: In the Abstract

Line 10:
   That part reading "a3) 014 35 percent" should read
   --0-35 percent--

Signed and Sealed this

Twenty-third Day of March, 1993

Attest:

STEPHEN G. KUNIN

Attesting Officer     Acting Commissioner of Patents and Trademarks